Figure 1:
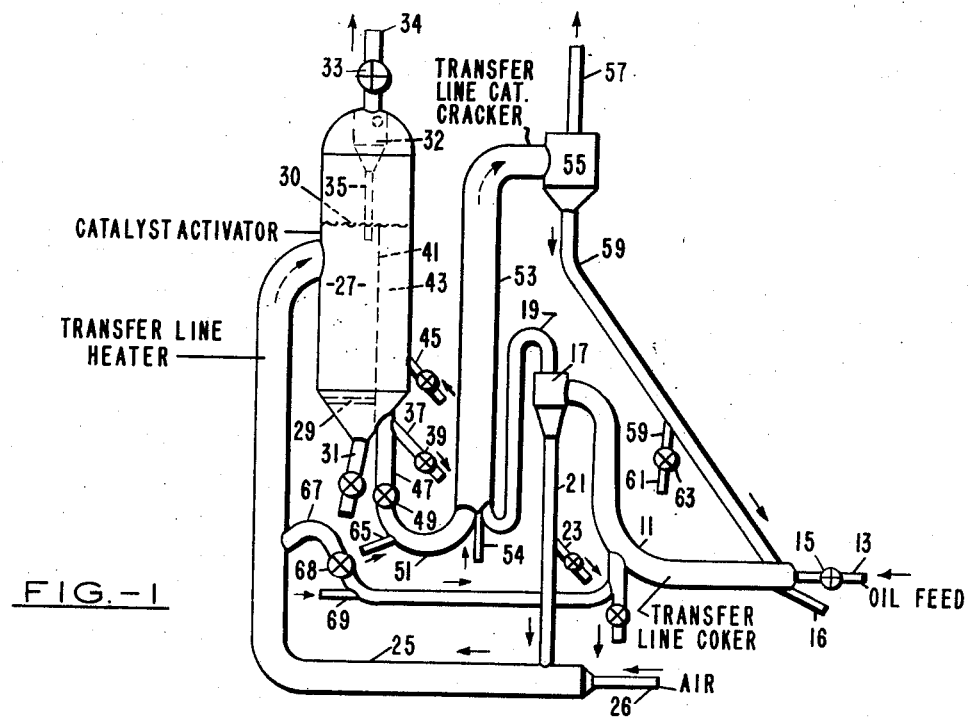

Sept. 15, 1959  A. VOORHIES, JR., ET AL  2,904,499
PROCESS AND APPARATUS FOR CONVERSION OF HEAVY OIL
WITH COKE PARTICLES IN TWO STAGES EMPLOYING
INERT AND CATALYTIC COKE SOLIDS
Filed Feb. 17, 1954

INVENTORS
ALEXIS VOORHIES JR.
CHARLES N. KIMBERLIN JR.
BY  *Edwin M. Thomas*  ATTORNEY

United States Patent Office 2,904,499
Patented Sept. 15, 1959

2,904,499

PROCESS AND APPARATUS FOR CONVERSION OF HEAVY OIL WITH COKE PARTICLES IN TWO STAGES EMPLOYING INERT AND CATALYTIC COKE SOLIDS

Alexis Voorhies, Jr., and Charles N. Kimberlin, Jr., Baton Rouge, La., assignors to Esso Research and Engineering Company, a corporation of Delaware Application February 17, 1954, Serial No. 410,898

14 Claims. (Cl. 208—55)

The present invention relates to a combination process and apparatus for conversion of heavy oil to more volatile and more valuable products. It pertains particularly to a process and apparatus for the conversion of heavy residual petroleum oils to motor fuels, olefins, raw materials for chemicals manufacture, and the like. The invention relates further to an improved process and apparatus for making efficient use of the sensible heat in preheated particulate solid particles which are used first to crack catalytically and later to thermally crack the feed.

According to the present invention, a heavy oil feed is contacted first with solid particles which are at a moderate or coking temperature, and which are spent or substantially spent so far as catalytic activity is concerned, to cause vaporization and some thermal cracking of the feed. Later the vaporized and thermally cracked portions of the feed are contacted at somewhat higher temperature with preheated catalytically active solid particles. By the latter treatment the coker vapor products are converted into more valuable materials such as low molecular weight olefins, high octane motor fuel, and the like.

It has previously been suggested in the art that heavy petroleum oils such as residua might be converted to more volatile and more valuable products by first contacting them with a mass of hot particulate solids, by which they are thermally cracked, and thereafter contacting them with conventional cracking catalysts. It has also been suggested that in lieu of the conventional cracking catalysts, usually particulate alumina, silica, or combinations thereof, cracking might be accomplished by utilizing an activated coke or carbon produced in the process. Often coker vapors contain such quantities of contaminants as to make the use of relatively expensive cracking catalysts uneconomical.

The present invention involves a specific improvement over the foregoing suggestions. Coke produced in the process, or other suitable catalytic material, usually of low economic value, is preferably first heated and activated catalytically, by contacting it with steam at a very high temperature. The resulting solid particulate material, which has a reasonably good catalytic cracking activity, is then contacted at its high initial temperature with freshly produced coker vapors. The latter are obtained by contacting the fresh feed of heavy oil or residuum with the spent and somewhat cooler catalytic particles after they emerge from the catalytic cracking operation.

By using this sequence of operations the same solid particles, heated only once, may be used for accomplishing two successive conversion reactions. By contacting the fresh feed with the solid particles in two stages, in the reverse order, the feed is first vaporized and cracked thermally and then the resulting vapor products are upgraded by catalytic action. The coker vapors may tend to contaminate and inactivate the catalyst in some degree, but the contaminants and in fact part of the catalyst itself, preferably coke obtained in the coking process, are burned to supply the necessary heat for carrying out the conversion.

Although activated carbon has been previously considered as a suitable catalyst for the cracking of residual oils it has not gone into substantial commercial use because the asphaltic and other gummy or tacky materials present in most residual petroleum oils used as coker feed cause rapid deactivation. Relatively large amounts of coke and related deposits, including ash-forming contaminants, may be formed quickly on the solids so that their catalytic activity is very short in duration. Moreover, the final products heretofore produced by contacting hydrocarbon oils with activated carbon have usually been composed primarily of normal paraffins. When used for motor fuel they have been of poor economic value because of their low octane number.

The process of the present invention overcomes these difficulties by first coking residuum feed at a temperature which, for fuel production, is preferably in the range of about 900 to 1100° F. For conversion to olefins or raw materials for chemicals manufacture, the temperature may be higher. This treatment converts the asphaltic constituents of the feed into coke. It also supplies a reasonably clean vaporized feed to the second or catalytic cracking stage. Although spent activated particles, particularly activated coke or carbon from the second or catalytic stage, are used for thermal cracking in the first stage, they are almost instantly and completely deactivated upon contact with the feed. Hence, the reactions occurring in the first or coking stage of feed conversion are essentially of the thermal cracking type and not catalytic. The spent catalyst from the first stage, whether of coke or of some other material such as sand, metal particles, carborundum, etc., serves as a seed or nucleus for the deposition of coke. Hence, thermal cracking, with practically no catalytic cracking, takes place in the first stage and a vaporized feed of reasonably good quality is supplied to the second or catalytic cracking stage.

In order to produce a motor fuel of good octane rating, according to the present invention, the second catalytic stage is operated at a fairly high temperature, 1020 to 1200° F., and with a correspondingly low contact time, 0.1 to 5 seconds. This normally will be a higher temperature than is used for the thermal cracking. However the contact time in the catalytic conversion stage usually is shorter. It has been found that by raising the temperature above the usual range of 850 to about 950° F. for conventional catalytic cracking, the olefinicity of the motor fuel product is markedly increased without serious losses in yield. Motor fuels of reasonably good octane number have been produced in the prior art by high temperature coking, i.e. by thermal conversion of residual oils in the temperature range of about 1020 to 1200° F. However, these thermal gasolines usually have been of low stability in storage. This is due apparently to the presence of small amounts of highly reactive and unstable hydrocarbons, probably diolefins or other polyunsaturates and the like. According to the present process, the use of an activated carbon catalyst in the temperature range of 1020 to 1200° F. avoids or at least materially reduces the production of these highly unstable materials. Consequently, both the yield and the quality of motor fuel are improved over those of fuels obtained in simple thermal cracking at high temperature.

The present invention is readily adaptable also to the production of low molecular weight chemical raw materials or "building blocks" such as the lower olefins, benzene and the like, as is commonly done by very high temperature coking or steam cracking operation. Thus, if normally gaseous olefins such as ethylene or propylene, etc., are desired instead of liquid motor fuels, these may readily be obtained by the process and apparatus of this invention by operating the second catalytic zone at a still higher temperature, preferably in the range of 1150° to 1350° F. A correspondingly shorter contact time should be used in this stage, in the range of 0.01 to about 2 seconds.

Hence the process is versatile and can be used without major change or adjustment for the production of either high grade motor fuel or of gaseous olefins and the like chemical starting materials.

The process has also the following specific advantages when coke is used as the solid particulate material:

(1) The process is self-contained with regard to catalyst i.e., the solid particles used for the second stage conversion. The coke that is formed in the initial coking of the feed is converted into an activated carbon having about 50 to 500 m.$^2$/g. surface area which serves as the catalyst or solid contact medium for the second zone;

(2) An excess of activated carbon over that required by the process is produced, so that this is available for use in other applications;

(3) No more coke need be burned than that required for heat balance. This is an advantage over other processes employing regenerable catalysts such as silica-alumina where all the coke formed must be burned for complete catalyst regeneration;

(4) Due to the large amount of coke produced by residual feeds, the rate of carbon withdrawal from the process is high. Therefore there is no opportunity for build-up on the catalyst of contaminants, e.g. metallic compounds, sulfur, etc., that might adversely affect the selectivity of the cracking process. This is an advantage over processes using the conventional and more expensive catalysts such as silica-alumina and the like.

Figure 2:
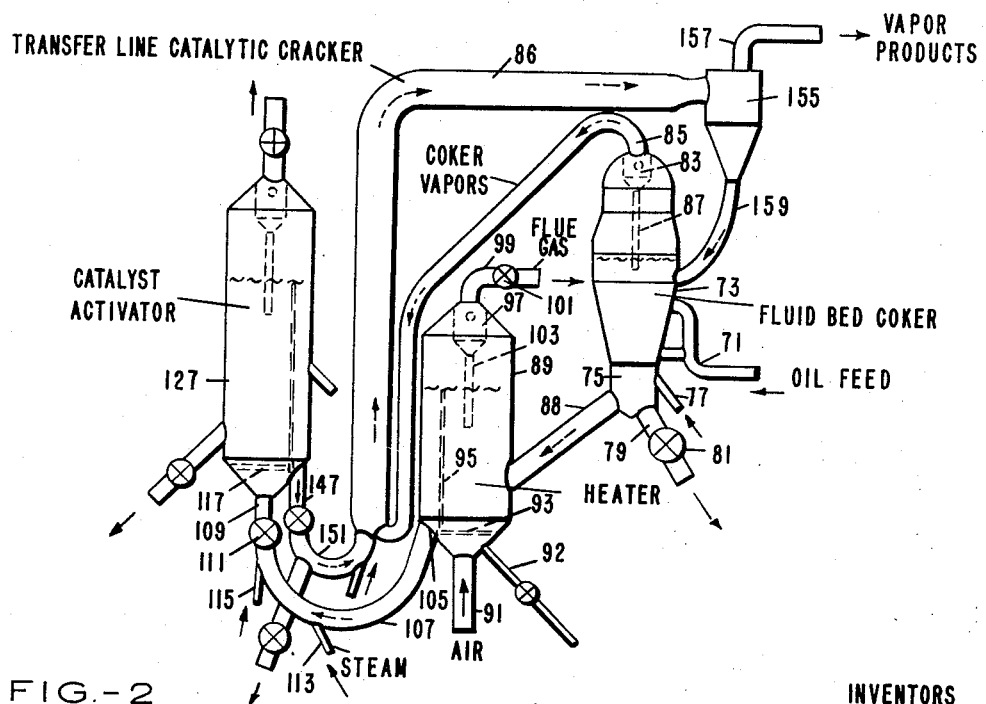

The invention will be more fully understood by referring to the accompanying drawing wherein two embodiments of the apparatus are illustrated diagrammatically. Fig. 1 shows a system wherein not only the high temperature or catalytic cracking operation but also the coking or thermal cracking and the reheating of the solid particles are accomplished in transfer line systems. Fig. 2 shows a generally similar system wherein catalytic cracking is accomplished in a transfer line but the coking and reheating are accomplished in fluid bed contacting systems.

Referring now to Fig. 1, the system shown involves a transfer line coker 11 into which the fresh oil feed to be converted is fed, as a spray or finely subdivided, through an inlet line 13 under control of a valve 15. The oil may be suitably preheated to any desired temperature, preferably below the coking range, i.e. not more than about 800° F. Steam, hydrocarbon gas or other inert propellant may be introduced through a line 16 to create a suspension of the hot solid particles in line 11. The solid particles in line 11 are at a sufficiently high temperature to cause vaporization and thermal cracking of the feed before the products reach the separator or cyclone 17 at the end of the coker. The preferred initial temperature of the solids is between about 900° and 1100° F. For production of motor fuels or products suitable for conversion thereto the contact time may be from 0.5 to 10 seconds or even longer, particularly at lower temperatures. The solids and vapors entering cyclone 17 are separated therein so that the vapors pass overhead through the outlet line 19 and the solids pass downwardly through line 21. If desired, a part of the solids may be withdrawn as a product coke through a sideline 23.

The spent solids from line 21 enter the transfer line heater 25 to which air is supplied through a line 26. The transfer line is of such dimensions as to permit the solid particles to be reheated to a necessary temperature, at least 1350° F. and preferably higher up to 1700° F., depending on the particular steps to be followed. By the time the solids and the free gases resulting from their combustion, etc., reach the end of the transfer line heater, the necessary temperature has been attained and all the products are carried into a catalyst activator zone. This zone is shown as embodying a vessel 27 in which the particulate solids may be fluidized by being supported upon a transverse grid 29, superheated steam being introduced through line 31. The steam fluidizes the solid particles and also activates or reactivates them to give them catalytic properties suitable for the cracking of the vapors from the transfer line coker. The activation reaction is endothermic and therefore exerts a cooling action on the solids in vessel 27. The endothermic heat of reaction is supplied by the sensible heat of the coke and gases entering vessel 27 by line 25. The temperature of the solids bed 30 in vessel 27 is preferably in the range of 1300° F. to 1500° F. Hydrogen and carbon monoxide are produced by the activation reaction and these products are removed overhead by being passed through a separator or cyclone 32 and through the outlet 34 controlled by valve 33. The process thus may be used to convert part of the coke to fuel gas. Entrained solids are separated and returned to the bed 30 in the vessel by means of the solids return line 35.

If desired, product catalyst may be withdrawn through a side line 37 under control of valve 39, since the process produces more catalyst than may be required to keep it in operation. The activated catalyst, usually but not necessarily simple coke produced in the process, overflows a partition 41 into a stripping zone 43. A line 45 is provided for introducing suitable stripping gas although this may not be necessary in many cases.

The activated catalyst flows downward from the stripping zone 43 into standpipe 47 controlled by a valve 49 and through a reverse bend 51 into a transfer line catalytic cracker 53. Here the vapors from line 19 are contacted and cracked catalytically to produce the high grade product desired. As noted above, if it is desired to produce high grade gasoline the transfer line cracker is operated at about 1020 to 1200° F. with contact time of 0.1 to 5 seconds. For the production of gaseous olefins and the like, the temperature is higher, 1150 to 1350° F., and the contact time shorter, 0.01 to 2 seconds, as previously noted. The hot coke or catalyst from line 47 supplies the heat required to raise the temperature of the vapors from line 19 to the desired cracking temperature. The hot catalyst also supplies the necessary heat for the endothermic cracking reaction with the result that the catalyst particles become somewhat cooled during passage through transfer line catalytic cracker 53. Additional propellant or suspending gas, such as steam, hydrocarbon gas, etc., may be supplied through line 54 when needed. The catalytic particles in the cracking zone 53 are coated with a fresh deposit of coke which gradually reduces their catalytic activity. By the time they reach the separator or cyclone 55 at the end of the transfer line catalytic cracker they are relatively inert, catalytically. Here the cracked vapor products are separated from the solids and taken overhead through line 57 to suitable recovery apparatus, not shown. The solids pass downwardly through line 59 to the transfer line coker 11 previously described. From here the process, so far as the solids are concerned, is repeated.

If desired, spent catalyst may be withdrawn from line 59 through a branch line 61 under control of a valve 63. Thus, product coke ar catalyst may be withdrawn either at 37, or at 59 or at any other desired point in the system.

It will be understood that suitable aerating or lifting gas taps may be provided at any required point, such as indicated at 65 in the return bend 51 as is conventional in the art.

In some cases, it may be desirable to add heat to the coking stage, e.g. when the high temperature conversion or catalytic cracking stage is prolonged or heat losses from the solids abnormally high. In such case, reheated solids may be returned through a line 67, under control of valve 68, direct from the heater to the coker. A propellant gas may be added at line 69 when needed.

Referring now to Fig. 2, the system shown is substantially equivalent to that shown in Fig. 1 except that fluid bed reactors are substituted for transfer line reactors in certain cases. The oil feed is brought hrough line 71 and sprayed in finely divided form into a fluid bed coker vessel 73 from which coke may be withdrawn from a stripper 75, stripping gas being introduced through a line 77. Lumps or agglomerated masses of coke which may form in the process, or product coke, may be withdrawn through line 79 under control of valve 81.

The coker vapors pass overhead through a conventional separator or cyclone 83 and out through the overhead outlet 85 to the catalytic cracker a high temperature conversion unit 86 which is essentially equivalent in all details with the transfer line cracker 53 described in Fig. 1. Solids separated from the vapors return to the bed in coker 73 via line 87.

Spent solids from the coker flow through line 88 into a heater or burner vessel 89. The latter is shown to be of the fluid bed type in Fig. 2. It may be a transfer line heater such as 25 of Fig. 1 if desired.

The heater 89 is supplied with a combustion supporting gas such as air through line 91 and grid 93 to form a fluidized bed of solids which overflow a partition 95. Flue gases pass overhead through separator or cyclone 97 and outlet line 99 controlled by valve 101. Entrained solids are returned to the bed through line 103. In burner vessel 89 a part of the coke is burned to raise the temperature of the remaining coke to the desired temperature, preferably in the range of 1350° to 1700° F., and thereby supply the heat requirements of the entire process. Alternatively, if desired, some other fuel such as gas or oil from line 92 may be burned in heater vessel 89 to raise the coke temperature and supply the process heat.

As the solids overflow the partition 95 they pass into a standpipe 105 and through a reverse bend 107 into riser 109 controlled by valve 111. Suitable fluidizing taps 113 and 115 are provided for steam to carry the solids up into the riser 109 and through a grid 117 in the bottom of catalyst activator vessel 127 which is similar in all essential details to the catalyst activator vessel 27 of Fig. 1. The steam which is superheated, also activates the hot particles.

The reactivated catalyst flows out through standpipe 147 and reverse bend 151 and joins the transfer line catalytic cracker unit 86 which is essentially the same as unit 53 of Fig. 1.

The catalytically cracked products are separated from the solids by separator or cyclone 155 and the products pass overhead through line 157 to suitable recovery apparatus, not shown. The separated solids, now spent catalytically but still hot enough to effect the thermal conversion and vaporization of feed, are returned to the coker vessel 73 through line 159.

In order to prevent formation of coke and other deposits in the recovery apparatus from the fluid bed coker 73 it may be desirable to operate the cyclone separator 83 rather inefficiently so as to permit considerable entrainment of solids into line 85. With the arrangement shown this is not harmful since the solids merely recycle through the catalytic cracker and back to the coker. The same is true with cyclone 17 in Fig. 1 where solids may be only partially separated and those still entrained may pass overhead through line 19 and through the catalytic cracker to be returned from cyclone 55, etc. Multistage cyclones may, of course, be used where needed for effective separation of solids from vapors.

It will be understood that various other modifications may be made in the arrangement and relationship of the vessels, transfer lines, etc., that suitable aeration and propelling gas may be introduced at any point required through suitable inlets and that equivalent steps and elements of apparatus may be substituted where they are obvious to those skilled in the art without departing from the invention.

What is claimed is:

1. The process of converting heavy residual oil to a more volatile product and coke which comprises contacting a fresh feedstream of said residual oil with a mobile mass of solid coke particles in the first conversion zone at a temperature between about 900° F. and 1100° F. for a time sufficient substantially to vaporize and thermally crack said oil feed and to deposit coke on said coke particles, separating coke solids from vaporous cracked products, reheating said solid coke particles to a temperature between about 1350° F. and 1700° F. by burning at least part of the coke thereon, then steam activating the reheated solid coke particles, then contacting the total separated vaporous cracked products from said first conversion zone with said reheated and activated solid coke particles in mobile form in a second conversion zone at a substantially higher temperature and a substantially shorter time than said first conversion zone to catalytically crack said vaporous cracked products, separating the catalytically cracked vaporous products from said solid coke particles, now relatively spent, and returning a sufficient amount of said relatively spent solid coke particles without heating to said first zone to supply heat of cracking for the fresh thermal cracking of the oil feed at a temperature between about 900° F. and 1100° F., thereby completing a cycle of said solid coke particles.

2. Process according to claim 1 wherein the second stage catalytic cracking temperature is between about 1020° and 1200° F.

3. Process according to claim 1 wherein the second stage catalytic cracking temperature is between about 1150° and 1350° F.

4. The process of converting heavy residual oil and the like to more volatile products and coke, which comprises contacting a feed stream of residual oil in a first stage with a mobile mass of hot finely divided coke particles at a temperature within the range of about 900 to 1100° F. for a period of time sufficient to vaporize the lower boiling components and substantially to thermally crack and coke higher boiling components of said feed, separating vapors so produced from said particles, heating at least a part of said separated coke particles to a temperature higher than required for said vaporization and thermal cracking, steam-treating said heated coke particles to activate them as cracking catalyst, contacting the vapors from said first contacting stage with said catalyst in mobile form and at a higher temperature and at substantially higher velocity and much shorter total contact time than in said first stage, for a period of time sufficient to substantially crack said vapors by catalytic action and to substantially cool and inactivate the catalyst, and passing the spent catalyst from the catalytic stage to the first stage to supply heat thereto to vaporize and thermally crack the feed in said first stage.

5. Process according to claim 4 wherein the catalytic cracking is carried out at a temperature and for a contact time suited primarily for production of motor fuel.

6. Process according to claim 4 wherein the catalytic cracking is carried out at a temperature and for a contact time suited primarily for production of normally gaseous olefins.

7. Process according to claim 4 wherein the mobile coke is in the form of a suspension in gasiform fluid.

8. Process according to claim 4 wherein the mobile coke is in the form of a fluidized bed.

9. An apparatus for cracking heavy oil in successive stages to produce more volatile products and coke, including in combination, a low temperature reactor of the mobile particulate solids type, a second stage reactor unit of the relatively high velocity, short contact time mobile particulate solids type, means for separating product vapors emerging from the low temperature reactor from particulate solids entrained therein, means for passing said vapors into said second stage reactor unit, means for transporting the solids separated from the low temperature reactor to a heating zone, means for heating said separated solids to a temperature substantially higher than required for said low temperature reactor, means including a separate vessel communicating with the outlet from said heating means for treating said heated solids with a fluid, means for feeding said heated and treated solids from said vessel to the inlet of said second stage reactor unit, said last mentioned means being the sole source of heat suplied to said second stage reactor unit, cyclone separator means for separating the heated and treated solids from the aforesaid vapors after a relatively short contact time in said second stage reactor unit to recover cracked products, and means for directly recycling said separated hot solids from said cyclone separator means associated with the second stage reactor to the low temperature reactor unit, said last mentioned means being the sole source of heat supplied to said low temperature reactor unit.

10. Apparatus according to claim 9 wherein the heating means is a transfer line heater.

11. Apparatus according to claim 9 wherein the heating means is a fluid solids bed heater.

12. Apparatus according to claim 9 wherein said vessel in said treating means includes a fluid solids bed and means for introducing steam to said vessel.

13. The process of converting heavy residual oil and the like to more volatile products and coke, which comprises contacting a feed stream of oil in a first stage with a mobile mass of hot finely divided coke particles at a temperature within the range of about 900 to 1000° F. for a period of time sufficient to vaporize the lower boiling components and substantially to thermally crack and coke higher boiling components of said feed, separating vapors so produced from said coke particles, heating at least a part of said separated particles to a temperature higher than required for said vaporization and thermal cracking, steam-treating said heated particles to activate them as cracking catalyst and thereafter contacting the vapors from said first contacting stage for a contact time of 0.01 to 5 seconds with said catalyst in a disperse, flowing stream and at a higher temperature than in said first stage, for a period of time sufficient to substantially crack said vapors by catalytic action, and passing the spent catalyst from said catalytic stage to said first stage as the hot solid for supplying heat to vaporize and thermally crack the residual oil feed in said first stage.

14. The process of converting heavy residual oil to more volatile products and coke, which comprises first contacting a fresh feed stream of said residual oil with a mobile mass of solid particles at a temperature within the range of 900 to 1100° F. for a time period sufficient to thermally crack said oil feed to vapors and to deposit some coke on said particles, reheating a substantial part of said coke particles to a temperature of at least 1350° F. by burning at least part of the deposited coke, activating the reheated coke particles, then contacting said vapors with said reheated and activated particles at a temperature of at least 1020° F. and above the first mentioned contacting temperature for a contact time of 0.01 to 5 seconds, to further convert said vapors by cracking, thereby cooling the reheated coke particles to a temperature suitable for supplying heat in said first contacting zone, and immediately passing at least part of the cooled coke particles into contact with fresh oil feed as aforesaid, thereby completing the cycle of solid coke particles.

References Cited in the file of this patent

UNITED STATES PATENTS

| | | |
|---|---|---|
| 2,388,055 | Hemminger | Oct. 30, 1945 |
| 2,396,109 | Martin | Mar. 5, 1946 |
| 2,428,715 | Marisic | Oct. 7, 1947 |
| 2,461,958 | Bonnell | Feb. 15, 1949 |
| 2,485,315 | Rex et al. | Oct. 18, 1949 |
| 2,731,395 | Jahnig et al. | Jan. 17, 1956 |
| 2,731,508 | Jahnig et al. | Jan. 17, 1956 |
| 2,763,600 | Adams | Sept. 18, 1956 |
| 2,763,601 | Martin | Sept. 18, 1956 |
| 2,813,916 | Boston | Nov. 19, 1957 |